United States Patent

Nishida et al.

[11] Patent Number: 6,153,332
[45] Date of Patent: Nov. 28, 2000

[54] CATHODE FOR LITHIUM SECONDARY BATTERY

[75] Inventors: Yasunori Nishida, Ibaraki; Kenichiro Kami, Aichi; Kenji Nakane, Ibaraki, all of Japan

[73] Assignee: Sumitomo Chemical Company, Limited, Osaka, Japan

[21] Appl. No.: 09/025,318

[22] Filed: Feb. 18, 1998

[30] Foreign Application Priority Data

Feb. 18, 1997 [JP] Japan ..................................... 9-034141

[51] Int. Cl.[7] ........................... H01M 4/62; H01M 10/18
[52] U.S. Cl. ........................................ 429/217; 429/231.45
[58] Field of Search ........................... 429/48, 217, 231.9

[56] References Cited

U.S. PATENT DOCUMENTS

| | | |
|---|---|---|
| 4,419,424 | 12/1983 | Julian . |
| 4,693,928 | 9/1987 | Foss ........................................ 428/236 |
| 4,743,349 | 5/1988 | Bachot et al. ........................... 204/242 |
| 4,997,730 | 3/1991 | Morigaki et al. ......................... 429/48 |
| 5,219,685 | 6/1993 | Taniguchi et al. . |

FOREIGN PATENT DOCUMENTS

0627776 A2  12/1994  European Pat. Off. .

OTHER PUBLICATIONS

Patent Abstracts of Japan, vol. 008, No. 256 (E–280), Nov. 22, 1984 (JP 59 128768A).

Patent Abstracts of Japan, vol. 005, No. 078 (E–058), May 22, 1981 (JP 56 026365A).

*Primary Examiner*—Maria Nuzzolillo
*Assistant Examiner*—Mark Ruthkosky
*Attorney, Agent, or Firm*—Sughrue, Mion, Zinn, Macpeak & Seas, PLLC

[57] ABSTRACT

A lithium secundary battery cathode composition comprising a cathode active material, a conductive substance and a binder, wherein the binder comprises a fluororesin and a polyolefin resin, and the amount of the fluororesin in the composition is 1 to 10% by weight and the amount of the polyolefin resin in the composition is 0.1 to 2% by weight.

The cathode using the cathode composition of the present invention has an excellent binding property with a current collector, and the lithium secondary battery of the present invention has a high energy density and improved safety against an external heating, and the industrial value is very high.

29 Claims, No Drawings

CATHODE FOR LITHIUM SECONDARY BATTERY

BACKGROUND OF THE INVENTION

1. Field of the Invention

The present invention relates to a cathode composition for a lithium secondary battery, a process for producing the same, and a lithium secondary battery using the same.

2. Description of the Related Art

In recent years, portable information instruments, such as a personal computer, a portable telephone and an information terminal, have been widely used. Since these instruments have various multimedia functions, the secondary battery used for such instrument as power supply is demanded to be small and light having a large capacity, namely, to have a high energy density. In this regard, aqueous secondary batteries, such as a lead-acid battery and a nickel-cadmium battery conventionally used, are not sufficient. Lithium secondary batteries which can attain a higher energy density, especially the lithium secondary batteries using as a cathode active material, lithium composite oxide such as lithiated cobalt dioxide, lithiated nickel dioxide, and spinel lithium manganese oxide, and as an anode active material, a carbonaceous material that can be doped/undoped with lithium ions, have been developed.

Since these lithium secondary batteries have inherently a large energy, maximum safety against abnormalities, such as an internal short circuit and an external short circuit, is required. Although poly(vinylidene fluoride)(which may hereinafter be referred to as "PVDF") and vinylidene fluoride copolymer have been used as the binder of the cathode composition for lithium secondary batteries, further improvement of safety against an external heating is required.

When the suspension of polytetrafluoroethylene (which may hereinafter be referred to as "PTFE"), tetrafluoroethylene-hexafluoropropylene copolymer or tetrafluoroethylene-perfluoroalkylvinylether copolymer is independently used as a binder, the dispersibility of the resin is not good or the binding property with the current collector of a cathode is not sufficient.

In case that the dispersion medium is water using, as a binder, the suspension dispersed in water medium such as a PTFE suspension, there is a problem that the battery capacity drops by the deterioration of a cathode active material.

SUMMARY OF THE INVENTION

The purpose of the present invention is to provide a cathode composition having the sufficient binding property with the current collector of the cathode for a lithium secondary battery, a cathode using said composition, a process for producing the same and a lithium secondary battery of a high energy density and of a higher safety.

As a result of intensive studies, the present inventors found that a lithium secondary battery of a high energy density having improved safety against the heat-generation caused by an external heating, an internal short circuit or a large current charging/discharging, and having an excellent binding property with a current collector by improved dispersibility of resins, is obtained by using the fluororesin having a high heat-resistance and the polyolefin resin having excellent binding property and dispersibility as the binder of the cathode composition, and by using alcohol for a dispersion medium of the composition paste, and thus completed the invention.

That is, the present invention is:

(1) A cathode composition for a lithium secondary battery comprising a cathode active material, a conductive substance and a binder, wherein the binder comprises a fluororesin and a polyolefin resin, and the amount of the fluororesin in the composition is 1 to 10% by weight and the amount of the polyolefin resin in the composition is 0.1 to 2% by weight.

(2) A cathode for a lithium secondary battery comprising a cathode composition and a current collector, wherein the composition of (1) is used as a cathode composition.

(3) A process for producing the cathode for a lithium secondary battery comprising a cathode active material, a conductive substance and a binder, wherein the binder of (1) is used as a binder, a fluororesin suspension and a polyolefin resin suspension, as the binder, the cathode active material and the conductive substance are mixed together to produce a composition paste, and the resultant composition paste is coated on a current collector and dried, then pressed.

(4) A process for producing the cathode for a lithium secondary battery comprising a cathode active material, a conductive substance and a binder, wherein said binder of (1) is used as a binder, the suspension of a fluororesin and a polyolefin resin, as the binder, the cathode active material and the conductive substance are mixed together to produce a composition paste, and the resultant composition paste is coated on a current collector and dried, then pressed.

(5) A process for producing the cathode for a lithium secondary battery according to (3) or (4), wherein said cathode is heat-treated at a temperature lower than the pyrolysis temperature of the fluororesin and higher than the melting point of the polyolefin resin, after coating the composition paste on a current collector and drying, and before pressing.

(6) A process for producing a cathode for a lithium secondary battery according to (3), (4) or (5), wherein the dispersion medium for the suspension contains alcohol.

(7) A lithium secondary battery comprising;
a cathode including a lithium composite oxide as a cathode active material; an anode including, as an active material, a lithium metal, a lithium alloy or a material that can be doped/undoped with lithium ions; and a liquid or solid electrolyte, wherein said cathode of (2) is used as a cathode.

DETAILED DESCRIPTION OF THE INVENTION

In the present invention, the cathode composition for a lithium secondary battery comprising a cathode active material, a conductive substance and a binder is characterized by that the binder comprises a fluororesin and a polyolefin resin, and the amount of the fluororesin in the composition is 1 to 10% by weight and the amount of the polyolefin resin in the composition is 0.1 to 2% by weight.

The amount of the fluororesin in the cathode composition is preferably 2 to 5% by weight, and the amount of the polyolefin resin in the cathode composition is preferably 0.2 to 1% by weight.

When the amount of the fluororesin in the cathode composition is less than 1% by weight, the binding property of the cathode is not enough, and when it exceeds 10% by weight, the resistance of the battery becomes high, and the heat-resistance or the electric capacity of the lithium secondary battery is not enough, and it is not preferable.

When the amount of the polyolefin resin in the cathode composition is less than 0.1% by weight, the binding property of the cathode is not enough, and when it exceeds 2% by weight, the resistance of the battery becomes high, and the heat-resistance or the electric capacity of the lithium secondary battery is not enough, and it is not preferable.

In the cathode composition for a lithium secondary battery, the amount of the fluororesin is preferably 35 to 95% by weight, and the amount of the polyolefin resin is preferably 65 to 5% by weight to the total amount of the fluororesin and the polyolefin resin.

When the amount of the fluororesin is less than 35% by weight to the total amount of the fluororesin and the polyolefin resin, the heat-resistance of the lithium secondary battery is sometimes insufficient, and when it exceeds 95% by weight, the binding property of the cathode is sometimes insufficient.

When the amount of the polyolefin is less than 5% by weight to the total amount of the fluororesin and the polyolefin resin, the binding property of the cathode is sometimes insufficient, and when it exceeds 65% by weight, the heat-resistance of the lithium secondary battery is sometimes insufficient.

In the present invention, the cathode for a lithium secondary battery comprising a cathode composition and a current collector is characterized by using the above-mentioned composition as a cathode composition.

Examples of the fluororesin used in the present invention include PTFE, tetrafluoroethylene-hexafluoropropylene copolymer and tetrafluoroethylene-perfluoroalkylvinylether copolymer.

Examples of the polyolefin resin used in the present invention include ethylene-methacrylic acid copolymer, ethylene-vinyl acetate copolymer, ethylene-vinyl alcohol copolymer, and ethylenic ionomer.

The polyolefin resin can be pyrolyzed until the amount of the polyolefin resin in the cathode composition is not less than 0.1% by weight, if needed, by heat-treating below the pyrolysis temperature of the fluororesin after forming a cathode.

Examples of the cathode active material used in the present invention include a material that can be doped/undoped with lithium ions, and specifically include a lithium composite oxide containing at least one transition metal, such as V, Mn, Fe, Co, and Ni and the like. The lithium composite oxide having an alpha-$NaFeO_2$ structure such as lithiated nickel dioxide and lithiated cobalt dioxide or a spinel structure such as spinel lithium manganese oxide is preferable, since the mean charging/discharging potential is high.

The lithium composite oxide can also contain various added elements. It is preferable that the lithiated nickel dioxide containing at least one element selected from the group consisting of Ti, V, Cr, Mn, Fe, Co, Cu, Ag, Mg, Al, Ga, In and Sn is used in an amount of 0.1 to 20% by mole to the sum of the molar amount of said metals and the molar amount of nickel in the lithiated nickel dioxide, since the cycle characteristic using at a high capacity is improved.

Examples of the conductive substance used in the present invention include a carbonaceous material, and specifically include natural graphite, artificial graphite, cokes, carbon black and the like. Such conductive substances may be used alone or in combination as a composite conductive substance, such as of artificial graphite and carbon black.

Next, the process for producing the cathode for a lithium secondary battery of the present invention is explained.

The process for producing the cathode comprising a cathode active material, a conductive substance and a binder, is characterized by that the above-mentioned binder is used as a binder, and by that a fluororesin suspension and a polyolefin resin suspension, as the binder, the cathode active material and the conductive substance are mixed together to produce a composition paste, and the resultant composition paste is coated on a current collector and dried, then pressed.

Examples of the dispersion medium used for the fluororesin suspension and the polyolefin resin suspension include alcohol, water and the like. It is preferable that the dispersion medium contains alcohol.

As the alcohol, dihydric alcohol such as ethylene glycol, propylene glycol and the like is preferable.

As the fluororesin suspension, the suspension of the fluororesin having a weight average particle diameter of not larger than 1 $\mu$m, selected from the group consisting of PTFE, tetrafluoroethylene-hexafluoropropylene copolymer and tetrafluoroethylene-perfluoroalkylvinylether copolymer is preferable, and the suspension of the fluororesin having a weight average particle diameter of not larger than 0.4 $\mu$m, selected from above group is especially preferable.

As the polyolefin resin suspension, the suspension of the polyolefin resin having a weight average particle diameter of not larger than 1 $\mu$m, selected from the group consisting of ethylene-methacrylic acid copolymer, ethylene-vinyl acetate copolymer, ethylene-vinyl alcohol copolymer, and ethylenic ionomer is preferable, and the suspension of the polyolefin resin having a weight average particle diameter of not larger than 0.5 $\mu$m, selected from above group is especially preferable.

In the process for producing the cathode of the present invention, the mixing order of a fluororesin suspension, a polyolefin resin suspension, a cathode active material and a conductive substance is not limited as long as the materials can be mixed and dispersed sufficiently without aggregation.

A process preferably mentioned is that a fluororesin suspension and a polyolefin resin suspension are mixed, then a cathode active material and a conductive substance are added simultaneously or successively to the mixed suspension, and mixed together.

Moreover, the mixing order of the suspension of a fluororesin and a polyolefin resin, and a cathode active material and a conductive substance is not limited, as long as the materials can be mixed and dispersed sufficiently without aggregation.

A process preferably mentioned is that a cathode active material and a conductive substance are added simultaneously or successively to the suspension obtained by dispersing a fluororesin and a polyolefin resin in a dispersion medium, and mixed together.

In this way, a composition paste is produced, and the resultant composition paste is coated on a current collector. Subsequently, after drying, it is pressed for compressive condensation.

Examples of the method coating a composition paste on a current collector include the method using a coating machine such as a reverse-roll, a gravure, a kiss-roll, a cast, a spray, a curtain, an extrusion, an air doctor, a blade, a rod, a knife and a squeeze and the like.

In the present invention, it is preferable that the composition is heat-treated after coating the composition paste on a current collector and drying. Specifically, it is preferable that the composition is heat-treated at a temperature lower than the pyrolysis temperature of the fluororesin and higher than the melting point of the polyolefin resin, after coating the composition on a current collector and drying, and before pressing, since binding property with a current collector is improved.

Examples of the pressing method include roll-pressing and plate-pressing, heating can be performed during pressing if necessary.

The lithium secondary battery of the present invention is characterized by using the above-mentioned cathode, wherein the lithium secondary battery comprising a cathode including a lithium composite oxide as a cathode active material, an anode including, as an active material, a carbonaceous material that can be doped/undoped with lithium ions, a lithium metal or a lithium alloy, and a liquid or solid electrolyte.

In the anode active material of the lithium secondary battery of the present invention, examples of the material that can be doped/undoped with lithium ions include carbonaceous materials such as natural graphite, artificial graphite, cokes, carbon black, pyrolytic carbons, carbon fibers, fired products of organic polymer compounds and the like; and a chalcogen compound such as oxide and sulfide, which can be doped/undoped with lithium ions at lower potentials than in the cathode. A carbonaceous material including a graphite material such as natural graphite and artificial graphite as a main component is preferred, because the combination of such a carbonaceous material and a cathode provides a high energy density due to the flatness of their charging/discharging potential and the low average working potential.

As to a combination of the anode with a liquid electrolyte, in case where the liquid electrolyte does not contain ethylene carbonate, an anode containing poly (ethylene carbonate) (which may hereinafter be referred to as "PEC") is preferably used to improve the cycle characteristic and the large-current discharging characteristic of the battery.

The carbonaceous material can be in any shape including a flaky shape like natural graphite, a spherical shape like mesocarbon micro-beads, a fibrous shape like graphitized carbon fiber and an agglomerate of fine powders. If required, a thermoplastic resin can be added as a binder to the carbonaceous material. Examples of a usable thermoplastic resin include PVDF, tetrafluoroethylene-hexafluoropropylene-vinylidene fluoride copolymer, polyethylene, polypropylene and the like.

Examples of the chalcogen compound such as oxide and sulfide used as the anode, include crystalline or amorphous oxides comprised of a group XIII element, a group XIV element or a group XV element of the periodic law, such as amorphous compounds essentially comprised of tin oxides. Similarly to the above, there can be added, as required, a carbonaceous material as the conductive substance, or a thermoplastic resin as the binder.

Examples of a usable anode current collector include copper, nickel, stainless steel and the like. Above all, copper is preferably used in the lithium secondary battery because copper hardly combines with lithium to form an alloy and is readily processed into a thin film. The composition containing the anode active material may be applied to the anode current collector by various methods, such as press forming. Alternatively, the composition may be pasted by the use of a solvent or the like, applied to the current collector, dried and adhered thereto by pressing.

A Examples of a separator employed by the lithium secondary battery according to the invention include microporous films made of polyolefin resins such as polyethylene, polypropylene and the like; and unwoven or woven fabrics such as of nylon. In the light of a higher energy density per volume and a smaller internal resistance, the separator preferably has the smallest possible thickness as long as the mechanical strength is secured. A preferred thickness thereof is in the range between 10 and 30 $\mu$m.

A Examples of the electrolyte employed by the lithium secondary battery according to the invention include a nonaqueous electrolyte solution in which a lithium salt is dissolved in an organic solvent, and any one of the known solid electrolytes. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic lithium carboxylate, $LiAlCl_4$ and the like. These salts may be used alone or in combination thereof It is preferred to use at least one of the salts containing fluorine or at least one salt selected from a group consisting of $LiPF_6$, $LiAsF_6$, $LiSbF_6$, $LiBF_4$, $LiCF_3SO_3$, $LiN(CF_3SO_2)_2$ and $LiC(CF_3SO_2)_3$.

Examples of the organic solvent usable for the nonaqueous electrolyte for the lithium secondary battery according to the invention include carbonates such as propylene carbonate, ethylene carbonate, dimethyl carbonate, diethyl carbonate, ethyl methyl carbonate, 4-trifluoromethyl-1,3-dioxolane-2-one, 1,2-di(methoxycarbonyloxy)ethane and the like; ethers such as 1,2-dimethoxyethane, 1,3-dimethoxypropane, pentafluoropropyl methyl ether, 2,2,3,3-tetrafluoropropyl difluoromethyl ether, tetrahydrofuran, 2-methyl tetrahydrofuran and the like; esters such as methyl formate, methyl acetate, $\gamma$-butyrolactone and the like; nitrites such as acetonitrile, butyronitrile and the like; amides such as N,N-dimethylformamide, N,N-dimethylacetoamide and the like; carbamates such as 3-methyl-2-oxazolidone and the like; sulfur-containing compounds such as sulfolane, dimethylsulfoxide, 1,3-propane sultone and the like; and the above organic solvents with a substituent including fluorine introduced therein. Normally, two or more compounds of the above are used in combination. Above all, a mixed solvent containing a carbonate is preferred and more preferred is a mixed solvent of a cyclic carbonate and a non-cyclic carbonate or of a cyclic carbonate and an ether.

As the mixed solvent of a cyclic carbonate and a non-cyclic carbonate, preferred is a mixed solvent containing ethylene carbonate, dimethyl carbonate and ethyl methyl carbonate, because such a mixed solvent provides a wide operating temperature range, an excellent drain capability and hardly decomposes even when the graphite material such as natural graphite and artificial graphite is used as an anode active material.

Examples of a usable solid electrolyte include polymer electrolytes such as polyethylene oxide polymer compounds and polymer compounds containing at least one of a poly-organosiloxane branch or polyoxyalkylene branch; sulfide electrolytes such as of $Li_2S$—$SiS_2$, $Li_2S$—$GeS_2$, $Li_2S$—$P_2S_5$, $Li_2S$—$B_2S_3$ and the like; and inorganic compound electrolytes comprising sulfides such as $Li_2S$—$SiS_2$—$Li_3PO_4$, $Li_2S$—$SiS_2$—$Li_2SO_4$ and the like. Additionally, also usable is a so-called gel-type electrolyte in which a nonaqueous liquid electrolyte is maintained by a polymer.

It is to be noted that the lithium secondary battery according to the invention is not particularly limited in shape and may have any one of the shapes such as a paper-sheet shape, a coin-like shape, a cylindrical shape and a rectangular parallelepiped shape.

EXAMPLES

Although the examples of the invention will hereinafter be described in detail, it is to be noted that the invention should not be limited to these examples.

Example 1

(1) Preparation of a Cathode Active Material

In 150 g of water, 15.21 g of aluminum hydroxide ($Al(OH)_3$; Kojundo Chemical Laboratory Co., Ltd., reagent of 3N grade) was dispersed, and 110.24 g of lithium nitrate (Kohnan Muki Ltd., chemical grade) was dissolved. Thereafter, 176.63 g of basic nickel carbonate [$xNiCO_3.yNi(OH)_2.zH_2O$: Nihon Kagaku Sangyo Co., Ltd., 43% Nickel Carbonate™] was added and dispersed well, and dried and then fired at 720°C. for 15 hours in a stream of oxygen in a tubular furnace having an alumina core tube. At this point, the molar ratio to the sum of the aluminum and nickel was set to be 0.13.

(2) Preparation of Cathode Sheet

A suspension of PTFE having a particle diameter of 0.15 to 0.35 μm in an amount of 3 parts by weight as a resin content, and a suspension of ethylene-methacrylic acid copolymer (melting point; about 90° C.) having a particle diameter of 0.1 μm in an amount of 0.5 parts by weight as a resin content were dispersed in propylene glycol. Then a conductive substance of powdery artificial graphite and acetylen black, and the cathode active material of lithiated nickel dioxide containing aluminum obtained in (1) were dispersed and kneaded to give a cathode composition paste.

The resultant paste was coated on the predetermined portion of both sides of aluminum foil as a current collector having a thickness of 20 μm, then dried, roll-pressed, and then heat-treated at 260°C. for 1 hour.

(3) Preparation of Anode Sheet

An active material of graphitized carbon fiber and an N-mathyl-2-pyrrolidone solution containing PVDF as a binder and the PEC having a number average molecular weight of 50000, were mixed together in a ratio of active material: PVDF: PEC=90:8:2 (weight ratio).

The resultant mixture was kneaded to obtain a paste of an anode composition. The resultant paste was coated on the predetermined portions of both sides of copper foil as a current collector having a thickness of 10 μm, then dried and roll-pressed, and the anode sheet was obtained.

The cathode sheet and the anode sheet thus prepared and a separator formed of a 25 μm-thick polyethylene microporous film were laminated in the order of the anode, the separator, the cathode and the separator, so as to form a lamination. The lamination was wound into a roll to form an electrode assembly shaped like a volute in section.

The aforesaid electrode assembly was inserted in a battery can in which the electrode assembly was impregnated with a nonaqueous electrolyte comprising a 50:50 mixed solution of dimethyl carbonate and 2,2,3,3-tetrafluoropropyl difluoromethyl ether having $LiPF_6$ dissolved therein in a concentration of 1 mol/l. Subsequently, a battery lid also serving as a cathode terminal with a safety vent was crimped onto the battery can and thus was obtained a cylindrical battery of 18650 size.

Using two cylindrical batteries thus obtained, after having performed 150% charge of the rated capacity to make an overcharged state, a heating test was carried out.

The heating test was performed according to the guideline for safety evaluation on secondary lithium cells (from Battery Association of Japan; SBA-G 1101–1995).

As a result, the batteries did not show a remarkable internal pressure rise up to 205° C., in spite of the severe state of overcharge.

Comparative Example 1

The cylinder battery of 18650 size was obtained in the same manner with example 1, except that PVDF was used as the binder in the cathode composition.

Using two cylinder batteries thus obtained, after having performed 150% charge of the rated capacity to make an overcharged state, a heating test was carried out as the same manner with Example 1.

As a result, the batteries showed a remarkable internal pressure rise at 198° C.

Example 2

Cathode sheets were prepared by coating a cathode composition paste on a current collector and drying in the same manner with Example 1.

With using the cathode sheets, a sample which was roll-pressed without heat-treating, and samples which were roll-pressed after heat-treating, respectively at 80, 120, 150 and 200°C. for 10 minutes were prepared.

Each of the sample sheets did not have any peeling and it had sufficient binding property for handling.

The binding property of each sheet was evaluated according to JIS K 5400 8.5.1. The sheets which were not heat-treated and heat-treated at 80° C. (lower than the melting point (about 90°C.) of ethylene-methacrylic acid copolymer), were evaluated as 6 points on the basis of 10 points.

The sheets which were heat-treated at 120, 150 or 200°C. (not lower than the melting point (about 90°C.) of ethylene-methacrylic acid copolymer, and lower than the pyrolysis temperature (about 500° C.) of PTFE), were evaluated as 8 points on the basis of 10 points.

As above, the binding property is further improved by heat-treating at a temperature lower than the pyrolysis temperature of a fluororesin and higher than the melting point of a polyolefin resin.

Comparative Example 2

Except not using the ethylene-methacrylic acid copolymer, a cathode sheet was prepared in the same manner with Example 1. The dispersion in a cathode composition paste was insufficient, and the peeling of the cathode composition was generated when the composition paste was coated on a current collector and dried.

The cathode using the cathode composition for a lithium secondary battery of the present invention has an excellent binding property with a current collector, and the lithium secondary battery of the present invention has a high energy density and improved safety against the external heating, and the industrial value is very high.

What is claimed is:

1. A lithium secondary battery cathode composition comprising a cathode active material, a conductive substance and a binder, wherein the binder comprises a fluororesin and a polyolefin resin, and the amount of the fluororesin in the composition is 1 to 10 percent by weight and the amount of the polyolefin resin in the composition is 0.1 to 2 percent by weight.

2. A cathode composition for a lithium secondary battery according to claim 1, wherein said fluororesin is 35 to 95% by weight, and said polyolefin resin is 65 to 5% by weight to the total amount of said fluororesin and said polyolefin resin.

3. A cathode for a lithium secondary battery comprising a cathode composition and a current collector, wherein said composition according to claim 1 or 2 is used as a cathode composition.

4. A process for producing a cathode for a lithium secondary battery comprising a cathode active material, a conductive substance and a binder according to claim 1 or 2, wherein said binder comprises a fluororesin suspension and a polyolefin resin suspension, wherein the process comprises mixing the fluororesin suspension and the polyolefin resin suspension, as the binder, the cathode active material and the conductive substance together to produce a composition paste, coating the resultant composition paste on a current collector, drying and then pressing.

5. A process for producing a cathode for a lithium secondary battery comprising a cathode active material, a conductive substance and a binder according to claim 1 or 2, wherein said binder comprises a suspension of a fluororesin and a polyolefin resin, wherein the process comprises mixing the suspension of the fluororesin and the polyolefin resin, as the binder, the cathode active material and the conductive substance together to produce a composition paste, coating the resultant composition paste on a current collector, drying and then pressing.

6. A process for producing a cathode for a lithium secondary battery according to claim 4, wherein said cathode is heat-treated at a temperature lower than the pyrolysis temperature of the fluororesin and higher than the melting point of the polyolefin resin, after coating the composition paste on a current collector and drying, and before pressing.

7. A process for producing a cathode for a lithium secondary battery according to claim 4, wherein the dispersion medium for said suspension contains alcohol.

8. A process for producing a cathode for a lithium secondary battery according to claim 4, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

9. A process for producing a cathode for a lithium secondary battery according to claim 4, wherein said polyolefin resin is the suspension of the polyolefin resin having a weight average particle diameter of 1 $\mu$m or less, and selected from the group consisting of ethylene-methacrylic acid copolymer, ethylene-vinyl acetate copolymer, ethylene-vinyl alcohol copolymer and ethylenic ionomer.

10. A lithium secondary battery comprising; a cathode including a lithium composite oxide as a cathode active material; an anode including, as an active material, a lithium metal, a lithium alloy or a material that can be doped/undoped with lithium ions; and a liquid or solid electrolyte, wherein said cathode according to claim 3 is used as a cathode.

11. A process for producing a cathode for a lithium secondary battery according to claim 5, wherein said cathode is heat-treated at a temperature lower than the pyrolysis temperature of the fluororesin and higher than the melting point of the polyolefin resin, after coating the composition paste on a current collector and drying, and before pressing.

12. A process for producing a cathode for a lithium secondary battery according to claim 5, wherein the dispersion medium for said suspension contains alcohol.

13. A process for producing a cathode for a lithium secondary battery according to claim 6, wherein the dispersion medium for said suspension contains alcohol.

14. A process for producing a cathode for a lithium secondary battery according to claim 11, wherein the dispersion medium for said suspension contains alcohol.

15. A process for producing a cathode for a lithium secondary battery according to claim 5, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

16. A process for producing a cathode for a lithium secondary battery according to claim 6, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

17. A process for producing a cathode for a lithium secondary battery according to claim 7, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

18. A process for producing a cathode for a lithium secondary battery according to claim 11, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

19. A process for producing a cathode for a lithium secondary battery according to claim 12, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

20. A process for producing a cathode for a lithium secondary battery according to claim 13, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

21. A process for producing a cathode for a lithium secondary battery according to claim 14, wherein said fluororesin suspension is the suspension of the fluororesin having a weight average particle diameter of 1 $\mu$m or less, and selected from the group consisting of polytetrafluoroethylene, tetrafluoroethylene-hexafluoropropylene copolymer and tetrafluoroethylene-perfluoroalkylvinylether copolymer.

22. A process for producing a cathode for a lithium secondary battery according to claim 5, wherein said polyolefin resin is the suspension of the polyolefin resin having a weight average particle diameter of 1 $\mu$m or less, and selected from the group consisting of ethylene-methacrylic acid copolymer, ethylene-vinyl acetate copolymer, ethylene-vinyl alcohol copolymer and ethylenic ionomer.

23. A process for producing a cathode for a lithium secondary battery according to claim 6, wherein said polyolefin resin is the suspension of the polyolefin resin having a weight average particle diameter of 1 $\mu$m or less, and selected from the group consisting of ethylene-methacrylic acid copolymer, ethylene-vinyl acetate copolymer, ethylene-vinyl alcohol copolymer and ethylenic ionomer.

24. A process for producing a cathode for a lithium secondary battery according to claim 7, wherein said polyolefin resin is the suspension of the polyolefin resin having a weight average particle diameter of 1 μm or less, and selected from the group consisting of ethylene-methacrylic acid copolymer, ethylene-vinyl acetate copolymer, ethylene-vinyl alcohol copolymer and ethylenic ionomer.

25. A process for producing a cathode for a lithium secondary battery according to claim 11, wherein said polyolefin resin is the suspension of the polyolefin resin having a weight average particle diameter of 1 μm or less, and selected from the group consisting of ethylene-methacrylic acid copolymer, ethylene-vinyl acetate copolymer, ethylene-vinyl alcohol copolymer and ethylenic ionomer.

26. A process for producing a cathode for a lithium secondary battery according to claim 12, wherein said polyolefin resin is the suspension of the polyolefin resin having a weight average particle diameter of 1 μm or less, and selected from the group consisting of ethylene-methacrylic acid copolymer, ethylene-vinyl acetate copolymer, ethylene-vinyl alcohol copolymer and ethylenic ionomer.

27. A process for producing a cathode for a lithium secondary battery according to claim 13, wherein said polyolefin resin is the suspension of the polyolefin resin having a weight average particle diameter of 1 μm or less, and selected from the group consisting of ethylene-methacrylic acid copolymer, ethylene-vinyl acetate copolymer, ethylene-vinyl alcohol copolymer and ethylenic ionomer.

28. A process for producing a cathode for a lithium secondary battery according to claim 14, wherein said polyolefin resin is the suspension of the polyolefin resin having a weight average particle diameter of 1 μm or less, and selected from the group consisting of ethylene-methacrylic acid copolymer, ethylene-vinyl acetate copolymer, ethylene-vinyl alcohol copolymer and ethylenic ionomer.

29. A cathode composition according to claim 1, wherein the amount of said fluororesin in said cathode composition is 2 to 5% by weigh.

* * * * *